R. CHILTON.
UNIVERSAL JOINT.
APPLICATION FILED APR. 11, 1919. RENEWED OCT. 13, 1920.
1,379,964.
Patented May 31, 1921.
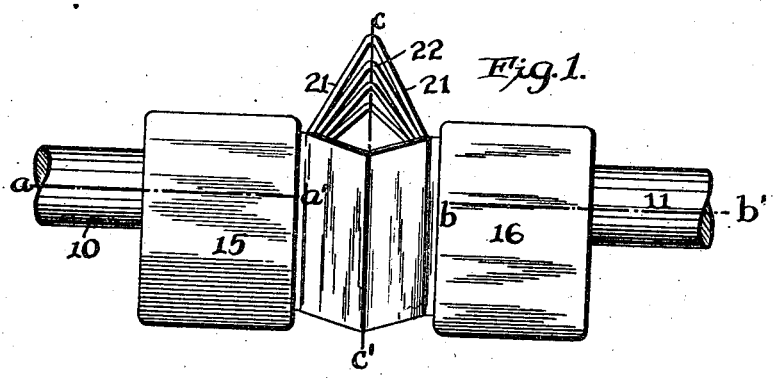
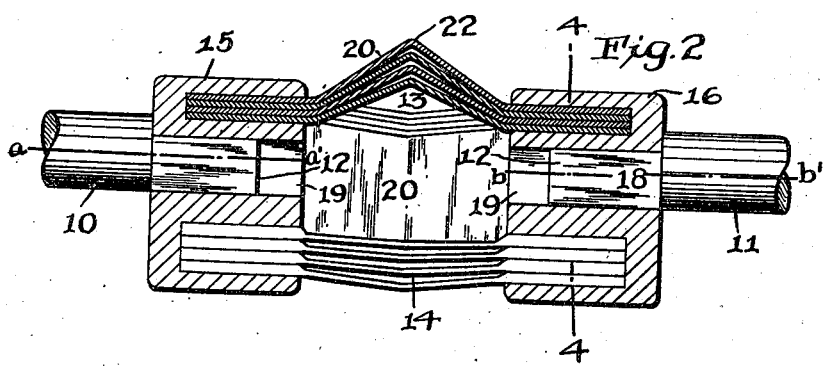
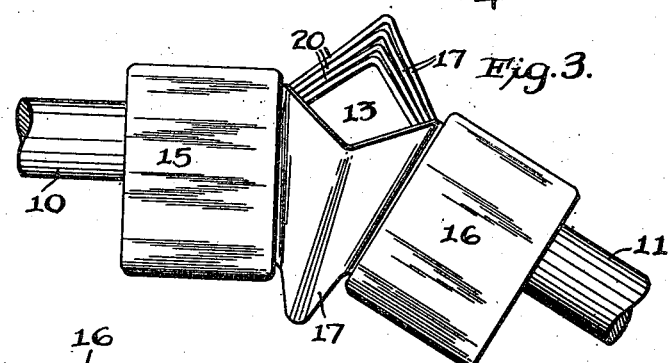
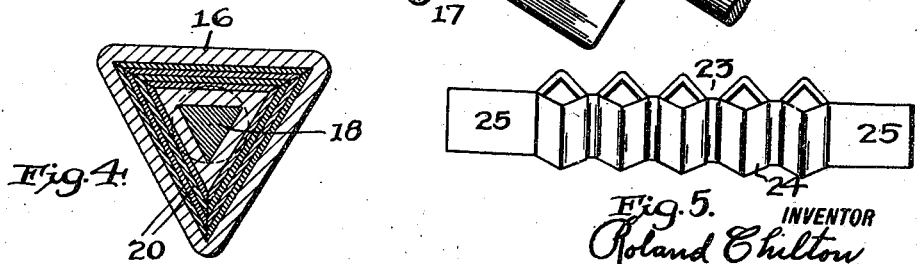
INVENTOR
Roland Chilton
BY
Messmer & Austin.
ATTORNEY

UNITED STATES PATENT OFFICE.

ROLAND CHILTON, OF MATAWAN, NEW JERSEY.

UNIVERSAL JOINT.

1,379,964. Specification of Letters Patent. Patented May 31, 1921.

Application filed April 11, 1919, Serial No. 289,358. Renewed October 13, 1920. Serial No. 416,781.

*To all whom it may concern:*

Be it known that I, ROLAND CHILTON, a subject of the King of England, and resident of Matawan, in the county of Monmouth and State of New Jersey, have invented certain new and useful Improvements in Universal Joints, of which the following is a specification.

The invention relates to an improvement in flexible driving couplings for installation between a driving and a driven member in situations where permissible relative movement of the members in certain directions is desired for any reason. As an example of one such situation it may be mentioned that the improved coupling herein disclosed may be used in place of the present coupling in an automobile propeller shaft.

The primary object of the invention is to provide a simple form of coupling formed of a relatively small amount of material but with the material proportioned and disposed to provide a coupling which will possess high efficiency in the transmission of rotary power between the members, in their different relative positions, and which will tend to resist relative movement about the axes of rotation of the members when subjected to torsional stresses incidental to the transmission of rotary motion.

Broadly this object is attained by connecting the driving and the driven member to opposite ends of an elongated power-transmitting-plate disposed to bring its greatest cross-sectional dimension in the direction of rotation of said members.

Another object of the invention is to provide a coupling of the class described, which will be characterized by a high degree of flexibility in responding to forces which tend to cause the members to move axially to or from each other and to forces which tend to cause the axes of rotation of the members to assume different angular relations to each other.

This object is attained by constructing the power transmitting plate of elastic material and arching the spring thus formed, intermediate the ends fastened to the power members, so as to dispose the intermediate part in normal position offset from the axes of rotation a distance different from the similar offset distance of the fastened ends thereby to permit the ends to approach or recede from each other by flexing the plate.

In place of single springs the invention contemplates the utilization of a plurality of laminate members where a high degree of flexibility is desired in the permissible directions above outlined.

In similar known constructions the driving forces are transmitted through contact between adjacent laminæ and between their surfaces of coaction with the driving or driven members resulting in an objectionable sliding action between the parts or else the buckling of the laminæ on the inside of the bend throws all the driving load on the outer laminæ which are thus unduly stressed.

Accordingly, another object of the invention is to provide a flexible coupling employing a laminate spring structure in which friction and resulting wear are avoided and in which each lamina assumes its proportion of the torsional strains.

This object is attained by fastening the ends of each of the arched laminæ to each other in sets and spacing the crowns of the arches from each other so that each lamina acts independently of each other lamina in the set.

Still another object of the invention is to provide a coupling of the class described which can be manufactured as a compact, rugged standard unit and which can be marketed as a one-piece or integral article of manufacture.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Referring to the accompanying drawings:—

Figure 1 is a view in side elevation showing a preferred embodiment of the invention in normal position coupling the ends of power members shown symbolically by shafts;

Fig. 2 is a sectional view taken axially of the device shown in Fig. 1 and with the coupling distended axially from its normal position;

Fig. 3 is a view similar to Fig. 1 but showing the power members angularly disposed and the coupling bent laterally;

Fig. 4 is a transverse sectional view taken on the line 4—4 of Fig. 2; and

Fig. 5 is a modified form of the invention constituting a development of the showing in Fig. 1.

In the following description and in the claims, parts will be identified by specific names for convenience of expression but they are intended to be as generic in their application to similar parts as the art will permit.

In the drawing there is shown a pair of power members 10 and 11 herein shown to be shafts mounted for rotary movement and either of which may be coupled to a source of power. One of the shafts 10 may be selectively considered as a driving member mounted within bearings (not shown) for rotation about an axis of rotation indicated by the line $a$—$a'$. The other shaft 11 may similarly be regarded as a driven member mounted for rotary movement about its axis of rotation indicated by the line $b$—$b'$. In this illustrated embodiment of the invention it is considered that the axes are normally in alinement and the parts rotate above a common axis of rotation indicated by the line $a$—$a'$ $b$—$b'$. The members 10 and 11 are intended, however, to have relative freedom of movement axially toward or from each other as shown in Fig. 2, and are intended to have relative freedom of movement to bring individual axes at an obtuse angle to each other as shown in Fig. 3.

The adjacent ends 12 of the members 10 and 11 are spaced apart in the direction of their lengths to provide a coupling space 13 therebetween and are coupled together by means of a manufactured unit 14 constituting a flexible coupling. The coupling includes a pair of formed spool shaped end hubs 15 and 16 disposed in substantial axial alinement and a plurality of sets of spring members 17 extending between and connecting the hubs.

The hubs are connected at their respective outer ends to their correlated power members, the connection being provided by reducing the contiguous ends of the shafts to form non-circular extensions 18, herein shown to be triangular shape in cross-section, and fitted in similar shaped openings 19 in the axis of the hubs. The outer ends of the shafts are upset to prevent the withdrawal of the same from the hubs. In this way rotary movement is positively conveyed to and from the power member and hubs without relative movement and without danger of the shafts slipping from the coupling when moved into the distended position shown in Fig. 2. The sets of members 17 are of laminate form and comprise stacks of spring plates 20 with opposite ends rigidly fixed to the hubs. These plates are preferably formed of a high grade tempered steel having relatively great strength essential in those situations where it is desired to transmit high power through a coupling of small dimensions. In the showing in Fig. 2 the hubs are cast about the ends of the plates and form an integral or at least a one-piece construction with the ends of the spring plates immovably fixed against relative movement and against movement relative to the power members. The spring members extend across the coupling space 13 and are disposed substantially parallel to the common axis of rotation. Preferably the plates are arranged in balanced pairs on opposite sides of the axis but for certain situations the three-set triangular disposition shown in Fig. 4 is of advantage. These sets are of similar construction so that the detailed description of any one set is sufficient for any number of sets.

The spring plates 20 are each bowed outwardly to form an arch structure preferably having an angle not more than 60° between each arm 21 of the plate when in normal position as shown in Fig. 1. It is within the scope of this invention, however, to bend the plates inwardly toward the axis of rotation and an alternate construction where a high degree of flexibility is desired is to bend the outer lamina outwardly and to bend the inner lamina inwardly. One of the features of this disclosure is that the plates have their widths disposed so that the transverse cross-section shown in Fig. 4 will extend substantially in the direction of rotation of the power members and will be tangent to the circle of rotation of one or both of the power members. This construction utilizes material to give maximum resistance to relative torsional movement of the power members while permitting high flexibility to all other relative movements of the power members.

While the ends of the plates of each set are fixed to each other, the intermediate portions of adjacent plates having progressively smaller angles between the arms 21 continuing outwardly so that they are progressively spaced apart toward the crowns 22. This construction maintains the laminæ spaced apart from each other and out of frictional contact. This arrangement avoids wear and frictional resistance in the spring sets and causes each lamina to assume its portion of the strains imposed on the coupling by the load torque. Preferably the arms forming each plate are similar in size and shape and are disposed symmetrically on opposite sides of a mid-plane of rotation indicated in Fig. 1 by the line $c$—$c'$.

In this disclosure the construction providing for rigidity against relative rotary movement of the power members has been featured. However, under some circumstances a less positive resistance to torsional or rotary yield may be desired and can be attained simply by redesigning the cross-section of the spring plates, reducing the width to obtain the desired elasticity of the plates across their width.

In general it will be understood that the form of plate illustrated is merely suggestive and can be varied to meet the demands for flexibility or rigidity in the different directions possible with a universal joint construction of the type disclosed.

It is within the scope of the disclosure to multiply the couplings hereinbefore described, and form a flexible shaft 23 simply by connecting the couplings longitudinally in series. Where the spring members in longitudinal alinement are connected integrally as shown in Fig. 5 they may be formed of strips of corrugated metal 24 and the sets of spring members thus formed fastened together at opposite ends to form the hub members 25.

By means of a device of this character it is possible to keep the adjacent axis of the shafts in concentric relation while permitting angular play of the axis relative to each other.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:—

1. In a device of the class described, the combination with a driving and a driven member normally disposed with their axes in substantial alinement, of a coupling disposed therebetween to transmit rotary movement from the driving to the driven member, said coupling including a pair of spring members positioned on opposite sides of said axes and each having their opposite ends rigidly secured to said members, each of said spring members including a plurality of laminate spring elements, each extending between its ends in a direction radially of said axis of rotation and each lamina adapted to assume its proportion of the torsional strain to which said spring member is subjected.

2. In a device of the class described, the combination of a driving member, a driven member and a coupling connecting the same, said coupling including a spring comprising a pair of arms extending in a radial direction, one from each of said members and connected to form an arched spring construction fastened at opposite ends to said members and each of said arms comprising a plurality of arched plates with their crowns spaced apart.

3. In a device of the class described, the combination of a driving member, a driven member and a flexible coupling therebetween, said coupling including a set of laminate superposed spring plates with each lamina having its opposite ends attached to the driving and driven members and said lamina being spaced apart intermediate their attached ends.

4. In a device of the class described, the combination of a driving and a driven member each mounted for rotary movement about their respective axis, flexible means supplementing each other for connecting the driving and driven members, said means including a laminated plate structure with the plates each having its greatest cross-sectional width extending substantially in the direction of rotation of one of said members whereby said device is characterized by freedom in relative angular movement of the members and by rigidity of relative torsional movement.

5. In a device of the class described, the combination of a driven and driving element mounted for rotary movement about an axis of rotation, a flexible connection therebetween including a laminated spring plate structure with its middle portion projecting radially relative to said axis of rotation, the spring plates of said structure secured together at opposite ends and free for relative movement between the ends.

6. In an elastic shaft coupling, two normally coaxial shafts, a coupling member on each shaft having slots extending tangent to the circle of rotation of the members, and plate springs connecting the coupling members, said springs having straight end portions fitting in the normally opposite slots of said members and approximately V-shaped portions connecting the straight end portions of said springs.

7. In an elastic shaft coupling, two normally coaxial hubs having slots extending tangent to the circle of rotation of the members and a laminated plate spring structure connecting the hubs, said structure including flat plates with their end portions fitted in said normally opposite slots and approximately V-shaped portions connecting the end portions and extending therefrom radially of the axis of rotation of the hubs, said hubs cast on the ends of the spring structure to hold the ends of the laminated springs rigidly to their respective hubs.

Signed at New York city, in the county of New York and State of New York this 8th day of April, A. D. 1919.

ROLAND CHILTON.